United States Patent [19]
Oxley et al.

[11] Patent Number: 5,253,949
[45] Date of Patent: Oct. 19, 1993

[54] FAIL-SAFE UNIVERSAL JOINT CONNECTION

[75] Inventors: Gerald K. Oxley; Frederick D. Venable; Jim L. Rau, all of Lafayette, Ind.

[73] Assignee: TRW Inc., Lyndhurst, Ohio

[21] Appl. No.: 918,635

[22] Filed: Jul. 21, 1992

[51] Int. Cl.$^5$ ............................................. F16B 7/04
[52] U.S. Cl. ..................... 403/317; 403/21; 403/155; 403/324; 403/378; 411/354; 411/970; 411/999; 411/174; 411/107
[58] Field of Search ............... 403/324, 316, 317, 21, 403/11, 12, 14, 155–156, 379, 378, 359, 373, 290, 322–323, 325, 327, 355; 24/458, 271; 411/354, 522, 523, 524, 970, 999, 966, 174, 107, 111–113

[56] References Cited

U.S. PATENT DOCUMENTS

| | | | |
|---|---|---|---|
| 2,448,278 | 8/1948 | Ronning | 403/359 |
| 2,873,496 | 2/1959 | Elms | 411/970 X |
| 2,885,231 | 5/1959 | Smith | 403/359 X |
| 2,926,034 | 2/1960 | Weaver | 403/359 X |
| 2,997,320 | 8/1961 | Sutherland | 403/316 |
| 3,178,987 | 4/1965 | Reese et al. | 411/523 |
| 3,923,409 | 12/1975 | Stoner | 403/373 X |
| 3,992,119 | 11/1976 | Recker | 403/316 |
| 4,125,337 | 11/1978 | Recker | 403/359 X |
| 4,443,144 | 4/1984 | Defrancq | 411/351 |
| 4,501,400 | 2/1985 | Leonardo | 248/74.2 X |
| 4,504,164 | 3/1985 | Bien | 403/109 |
| 4,628,758 | 12/1986 | Yazuriha et al. | 74/498 |

FOREIGN PATENT DOCUMENTS 653174 11/1962 Canada ................. 403/359

Primary Examiner—Randolph A. Reese
Assistant Examiner—Harry C. Kim
Attorney, Agent, or Firm—Tarolli, Sundheim & Covell

[57] ABSTRACT

A universal joint (10) for a steering gear input shaft (11) includes a yoke (12), a bolt (14) movable into an installed position in the yoke, and a spring clip (22) for locking the bolt in its installed position in the yoke. The spring clip (22) moves with the bolt (14) when the bolt is moved into its installed position in the yoke (12), and has first and second portions (202, 212). The first and second portions (202, 212) of the spring clip (22) have locking positions in which the first portion (202) engages the bolt (14) and the second portion (212) interlocks with the yoke (12) to block movement of the bolt out of the yoke. The second portion (212) of the spring clip (22) moves resiliently into its locking position to interlock with the yoke (12) upon movement of the bolt (14) into its installed position in the yoke (12).

21 Claims, 7 Drawing Sheets

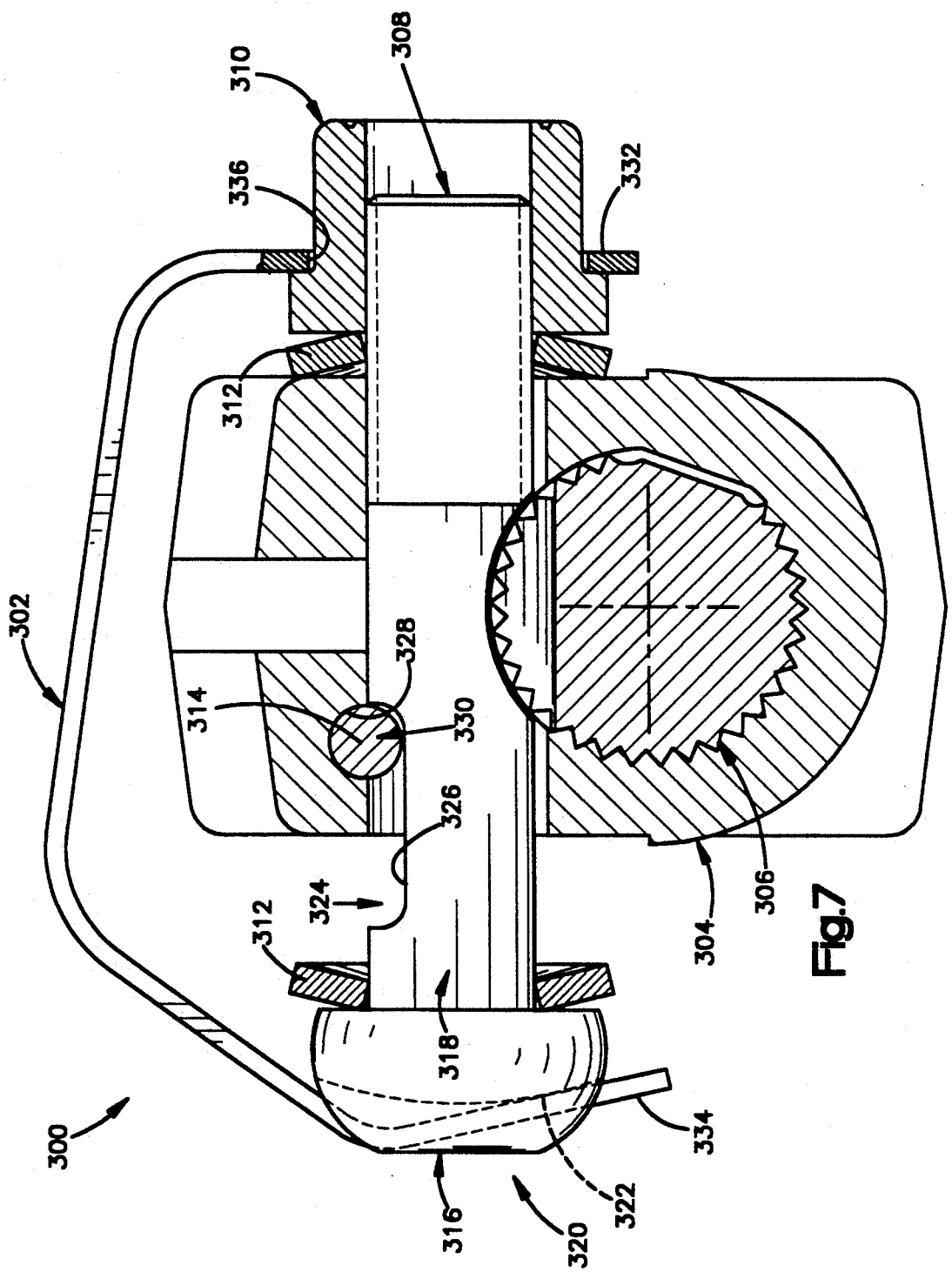

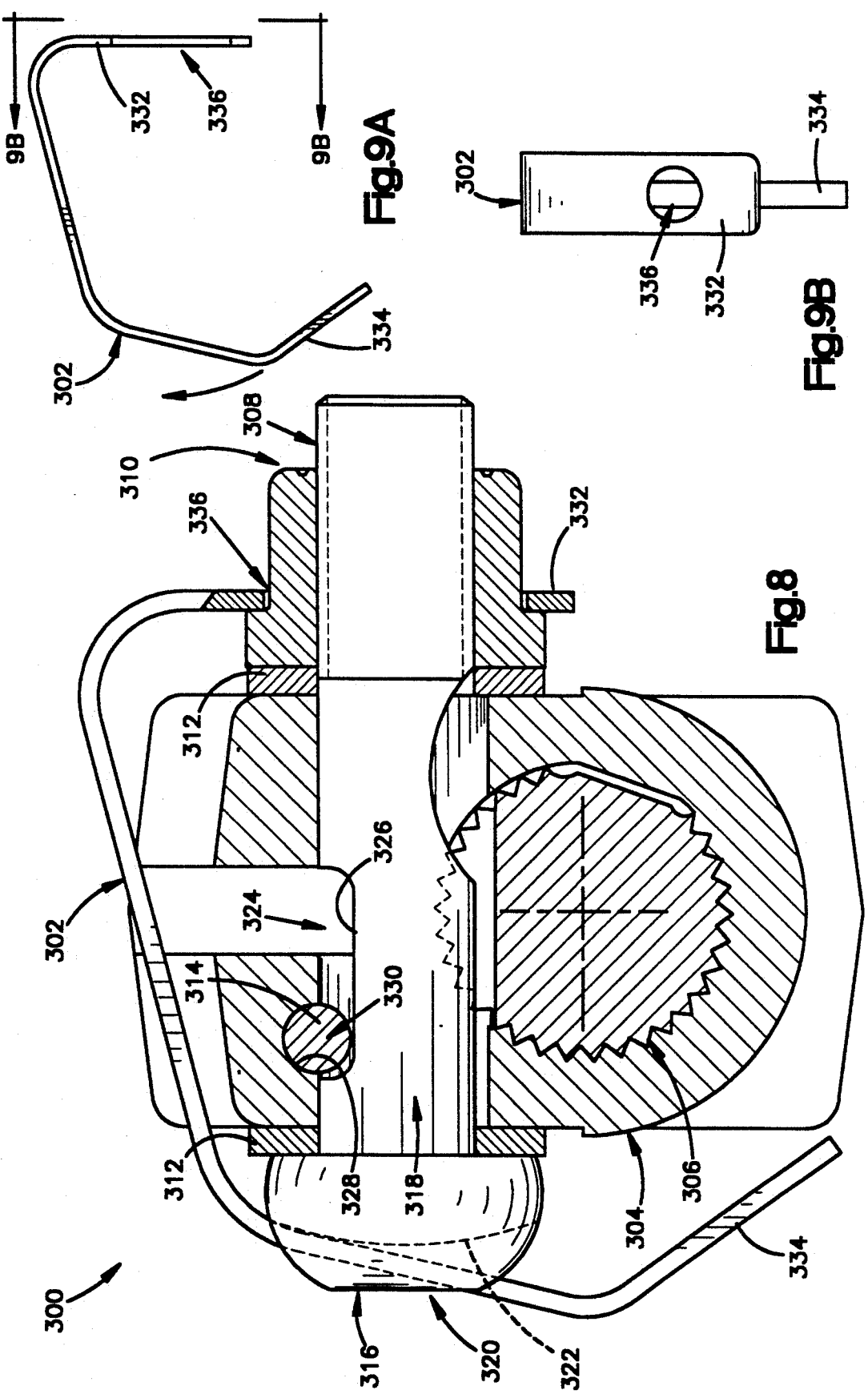

FAIL-SAFE UNIVERSAL JOINT CONNECTION

FIELD OF THE INVENTION

The present invention relates to a fail-safe joint, and particularly to a fail-safe universal joint for connecting steering shafts in a vehicle steering assembly.

BACKGROUND OF THE INVENTION

U.S. Pat. No. 4,504,164 discloses a universal joint for connecting two steering shafts to each other in a vehicle steering assembly. The universal joint includes a pair of pivotally connected yokes. The yokes are fixed to the steering shafts. During assembly, one of the steering shafts is moved axially into one of the yokes, and a spring clip acts to align a passage in the steering shaft with a passage in the yoke. A bolt is then installed through the aligned passages to fasten the steering shaft with the yoke. The spring clip disclosed in the '164 patent does not act to hold the bolt in place if the bolt should become severed.

SUMMARY OF THE INVENTION

In accordance with the present invention, an apparatus comprises a bolt receiving member having a passage and a bolt movable into an installed position in the passage. The apparatus further comprises a spring clip which moves with the bolt when the bolt is moved into its installed position, and which locks the bolt in its installed position.

The spring clip has first and second portions. The first and second portions of the spring clip have initial positions in which the first portion engages the bolt and the second portion engages the bolt receiving member. The first and second portions of the spring clip further have locking positions in which the first portion engages the bolt and the second portion interlocks with the bolt receiving member to block movement of the bolt out of the passage.

The second portion of the spring clip is movable against a bias of the spring clip from its initial position to an intermediate position upon movement of the bolt in the passage. The second portion of the spring clip is further movable under the influence of the bias from the intermediate position to its locking position upon movement of the bolt into its installed position. The second portion of the spring clip thus moves resiliently into its locking position to interlock with the bolt receiving member upon movement of the bolt into its installed position.

In a preferred embodiment of the invention, the bolt receiving member is a yoke in a universal joint which connects one steering shaft to another steering shaft in a vehicle steering system. The yoke has a base portion with a cylindrical passage in which one of the steering shafts is received. The steering shaft is clamped in the yoke by the bolt and a nut when the bolt is in its installed position in the yoke. The preferred embodiment further includes another spring clip. The other spring clip engages the nut and interlocks with the yoke to lock the nut on the bolt.

An apparatus constructed in accordance with the present invention provides a fail-safe connection. If the bolt should become severed, the spring clips hold the severed bolt in the yoke because the spring clips are interlocked with the bolt and the yoke.

BRIEF DESCRIPTION OF THE DRAWINGS

Further features of the present invention will become apparent to those skilled in the art to which the present invention relates from reading the following specification with reference to the accompanying drawings, in which:

FIG. 7 is a view of a second embodiment of the present invention;

FIG. 8 is a view of the embodiment of FIG. 7 with parts shown in different positions;

FIG. 9A is a view of a part of the apparatus of FIGS. 7 and 8; and

FIG. 9B is a view taken on line 9B—9B of FIG. 9A.

DESCRIPTION OF PREFERRED EMBODIMENTS

Figure 1:
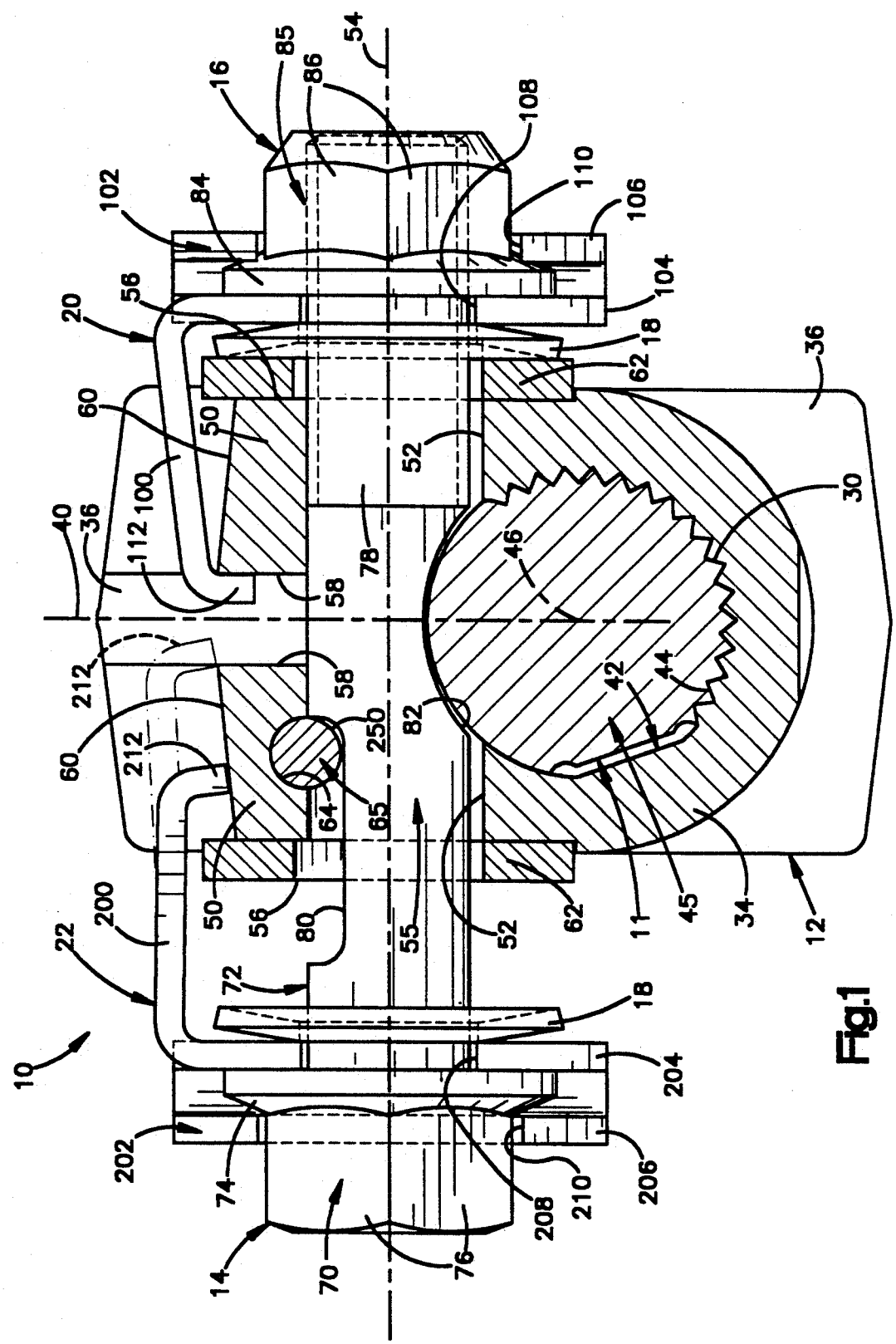
FIG. 1 is a view of a first embodiment of the present invention.
Figure 2:
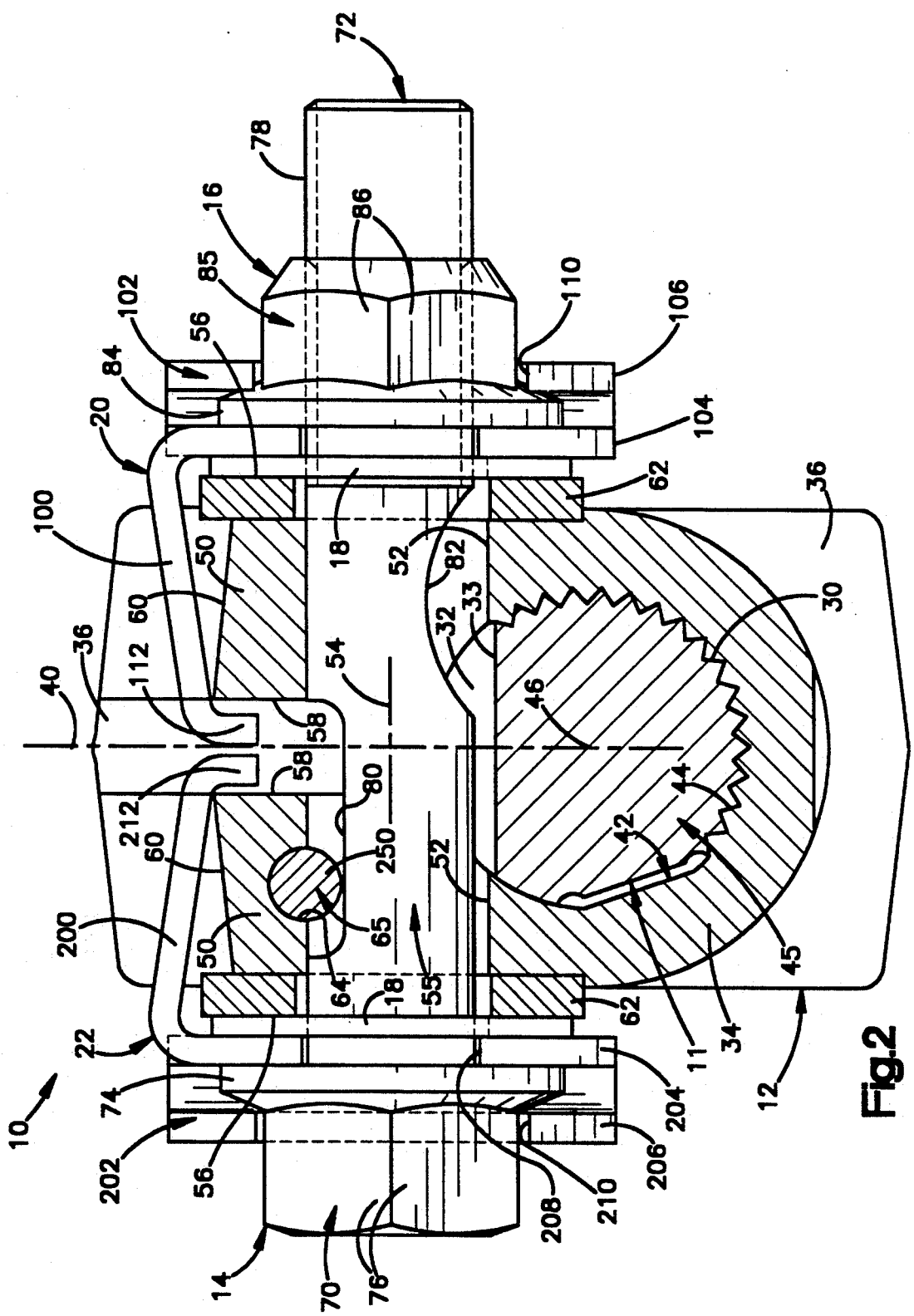
FIG. 2 is a view of the apparatus of FIG. 1 showing parts in installed positions.

A first embodiment of the present invention is shown in FIG. 1. As shown in FIG. 1, the first embodiment is an apparatus 10 which includes a shaft 11, a yoke 12 and a bolt 14. The apparatus 10 further includes a nut 16, a pair of belleville washers 18 and a pair of spring clips 20 and 22. As shown in FIG. 2, the bolt 14 and the nut 16 have locking positions in which the bolt 14 and the nut 16 clamp the shaft 11 in the yoke 12. The spring clips 20 and 22 have locking positions in which the spring clips 20 and 22 hold the bolt 14 and the nut 16 against the yoke 12.

The shaft 11 is a steering gear input shaft in a vehicle steering system, and the yoke 12 is part of a universal joint connecting the shaft 11 to another steering shaft (not shown) in the vehicle steering system. The shaft 11 has a splined surface portion 30 extending partially around its circumference, and has a notch 32 (FIG. 2) with a flat surface portion 33 extending partly along its length. Such a steering gear input shaft is formed of steel, as is known in the art.

Figure 3:
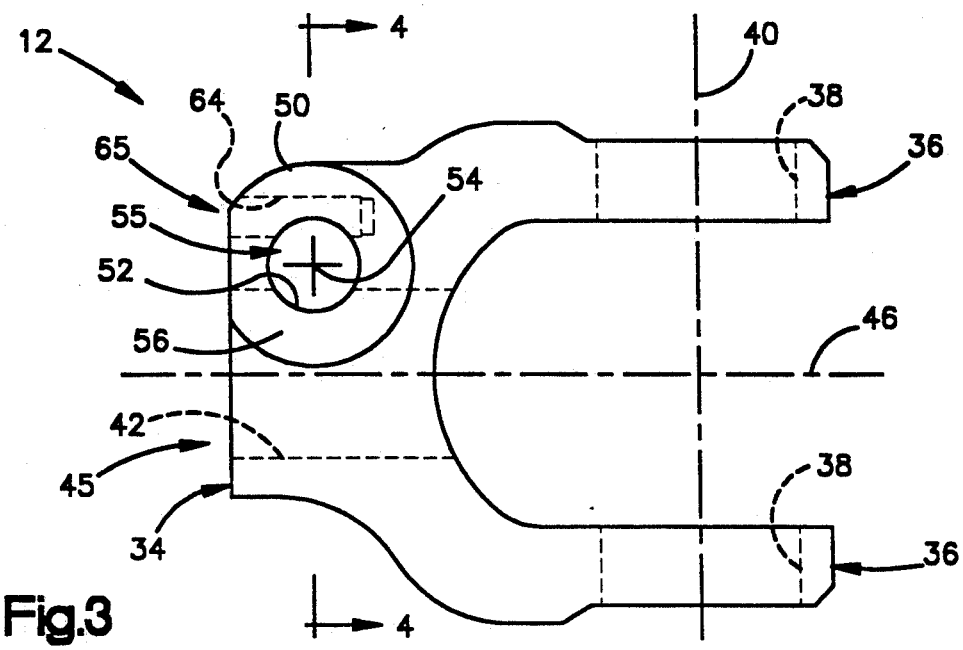
FIG. 3 is a view of a part of the apparatus of FIGS. 1 and 2.
Figure 4:
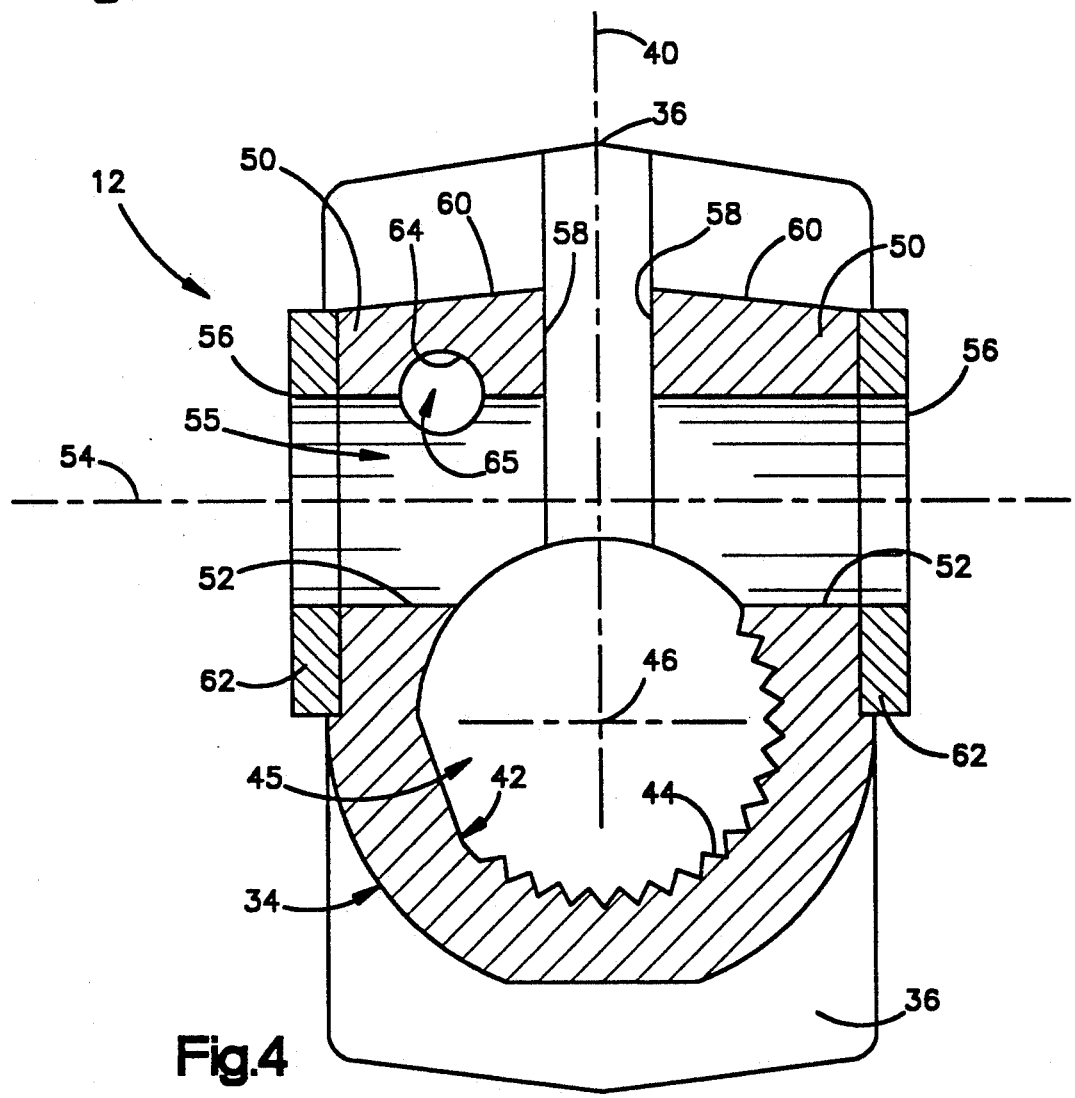
FIG. 4 is a view taken on line 4—4 of FIG. 3.

As shown in FIGS. 3 and 4, the yoke 12 has a base 34 and a pair of arms 36 extending from the base 34. Each of the arms 36 has a cylindrical inner surface 38 defining a passage extending through the arm 36 along a first axis 40. The arms 36 are thus constructed to connect the yoke 12 to other parts of a universal joint (not shown). The base 34 of the yoke 12 has a substantially cylindrical inner surface 42 with a splined portion 44. The inner surface 42 of the base 34 defines a longitudinal passage 45 extending through the base 34 along a second axis 46 which is perpendicular to the first axis 40. The base 34 of the yoke 12 is thus constructed to receive the shaft 11 coaxially through the longitudinal passage 45, as shown in FIGS. 1 and 2.

The base 34 of the yoke 12 has a pair of clamping portions 50. Each of the clamping portions 50 has a cylindrical inner surface 52 centered on a third axis 54 which is perpendicular to the first and second axes 40 and 46. The cylindrical inner surfaces 52 together define a transverse passage 55 extending through the base 34 along the third axis 54.

Each of the clamping portions 50 of the base 34 also has an outer surface 56, an inner surface 58 and an upper surface 60. As shown in the drawings, the yoke 12 is a prototype in which the outer surfaces 56 are located on washers 62 which are welded to the base 34. In production, the yoke 12 would preferably be a single piece with such outer surfaces located on suitably wider clamping portions 50. The inner surfaces 58 are spaced from each other. The upper surfaces 60 are planar surfaces extending from the outer surfaces 56 to the inner surfaces 58, and are inclined relative to the third axis 54 to slope upwardly toward the inner surfaces 58. One of the clamping portions 50 further has a cylindrical inner surface 64 which defines a relatively small passage 65 extending into the yoke 12 in a direction parallel to the second axis 46.

The yoke 12 is preferably a forging of SAE 1018 or 1020 carbon steel, TRW part number K91431, with the washers 62 being formed of SAE 1020-1025 steel. The washers 62 optionally can be SAE 1146 steel.

The bolt 14 has a head 70 and a shank 72. The head 70 has a circular flange 74 and a plurality of flat sides 76. The shank 72 has a threaded end portion 78. The shank 72 also has a flat recessed portion 80 and a cylindrical recessed portion 82. The bolt 14 is movable axially in the transverse passage 55 in the yoke 12 from an initial position, as shown in FIG. 1, to an installed position, as shown in FIG. 2. The nut 16 has a circular flange 84 and a body portion 85 with a plurality of flat sides 86 and is receivable on the threaded end portion 78 of the bolt 14.

The bolt 14 and the nut 16 are preferably SAE grade 8 fasteners with cadmium or zinc dichromate finishes. Each of the belleville washers 18 is preferably Rolex part no. 55-12-41, which is formed of spring steel.

Figure 5A:
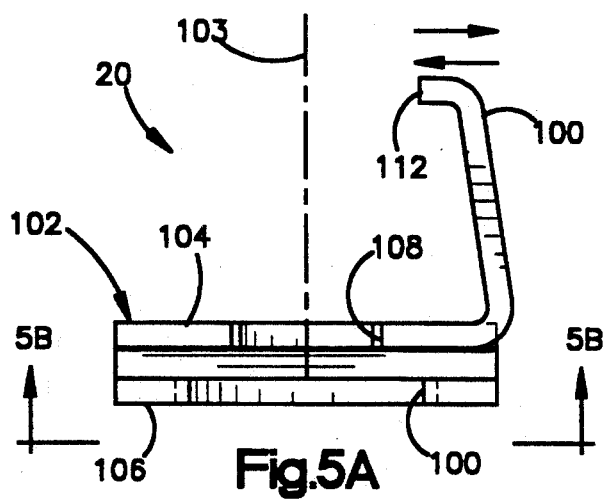
FIG. 5A is a view of another part of the apparatus of FIGS. 1 and 2.
Figures 5B, 5C:
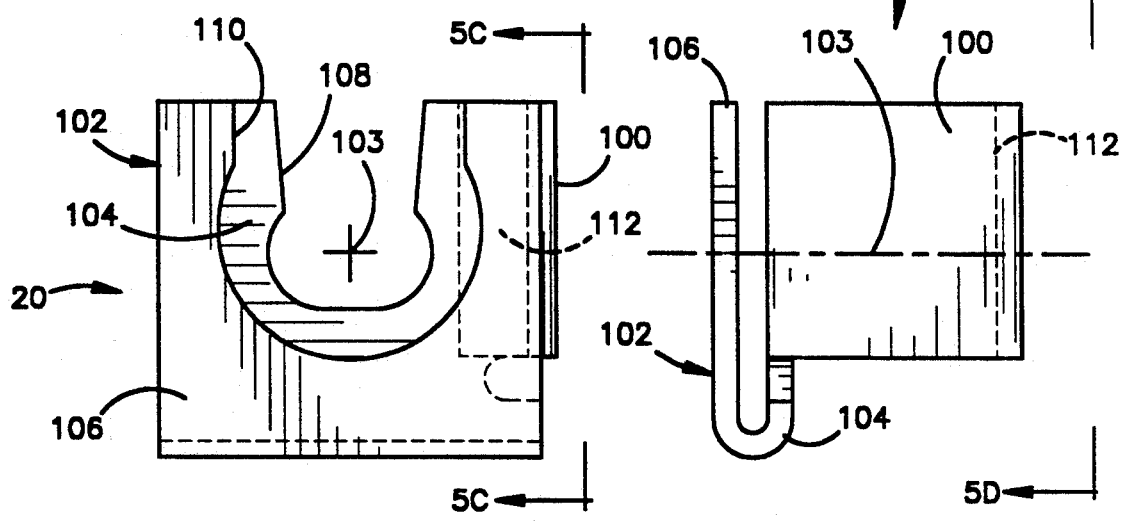
FIG. 5B is a view taken on line 5B—5B of FIG. 5A.
FIG. 5C is a view taken on line 5C—5C of FIG. 5B.
Figure 5D:
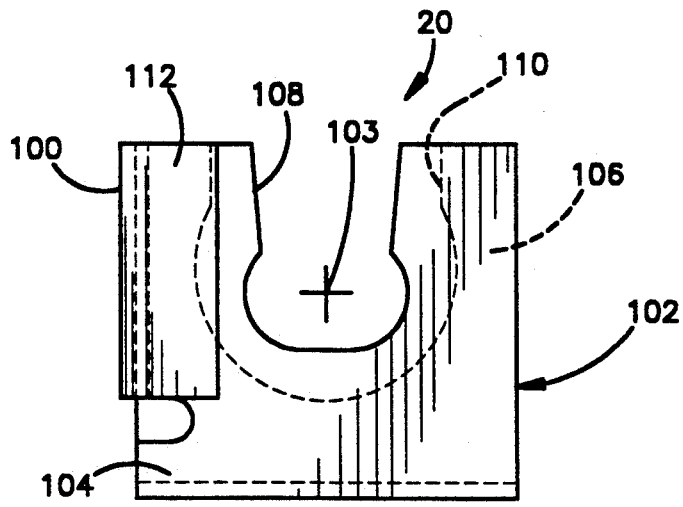
FIG. 5D is a view taken on line 5D—5D of FIG. 5C.

As shown in FIGS. 5A and 5D, the first spring clip 20 is a single piece of spring steel having a spring arm 100 and a base portion 102 with an axis 103. The base portion 102 is C-shaped with a first base wall 104 and a second base wall 106. The first base wall 104 has a slot 108. The slot 108 has a size and shape for the shank 72 on the bolt 14 to extend through the slot 108 along the axis 103. The second base wall 106 has a slot 110 with a size and shape for the body portion 85 of the nut 16, as well as the shank 72 of the bolt 14, to extend through the slot 110 along the axis 103. Additionally, the first base wall 104 is spaced from the second base wall 106 an amount for the flange 84 on the nut 16 to fit between the first and second base walls 104 and 106. The base portion 102 of the first spring clip 20 is thus constructed to fit over the bolt 14 and the nut 16 as shown in FIGS. 1 and 2. When the base portion 102 of the first spring clip 20 is thus received over the bolt 14 and the nut 16, the rounded shape of the slot 110 permits the nut 16 to rotate on the bolt 14 relative to the first spring clip 20.

The spring ar 100 of the first spring clip 20 extends from one side of the base portion 102 at a slight inclination to the axis 103, as shown in FIG. 5A, and has an end portion 112 which extends in a direction substantially perpendicular to the axis 103. The spring arm 100 is movable relative to the base portion 102 against a bias of the first spring clip 20 in a direction away from the axis 103, as indicated by the arrow pointing to the right in FIG. 5A, and is movable relative to the base portion 102 back in the opposite direction toward the axis 103 under the influence of the bias, as indicated by the arrow pointing to the left in FIG. 5A.

As shown in FIG. 1, the first spring clip 20 has a first locking position engaged with the yoke 12, the bolt 14 and the nut 16. When the first spring clip 20 is in its first locking position, the base portion 102 is received over the bolt 14 and the nut 16 as described above. The spring arm 100 extends from the base portion 102 in a direction generally parallel to the third axis 54 of the yoke 12, and the end portion 112 of the spring arm 100 extends into the space defined between the inner surfaces 58 on the yoke 12. The end portion 112 of the spring arm 100 thus blocks movement of the first spring clip 20 and the nut 16 along the axis 54 in a direction to the right as viewed in FIG. 1 when the first spring clip 20 is in its first locking position.

As shown in FIGS. 6A-6D, the second spring clip 22 also is a single piece of spring steel, and has a spring arm 200 and a base portion 202 with an axis 203. The base portion 202 is C-shaped with a first base wall 204 and a second base wall 206. The first base wall 204 has a slot 208 with a size and shape for the shank 72 on the bolt 14 to extend through the slot 208 along the axis 203. The shank 72 on the bolt 14 is rotatable about its axis relative to the second spring clip 22 when it extends through the slot 208 in the first base wall 204. The second base wall 206 has a slot 210 with a size and shape for the flat sides 76 of the bolt head 70 to extend through the slot 210 along the axis 203. However, the size and shape of the slot 210 in the second base wall 206 blocks rotation of the bolt head 70 about its axis relative to the second spring clip 22 when the bolt head 70 extends through the slot 210. Additionally, the second base wall 206 is spaced from the first base wall 204 an amount for the flange 74 on the bolt head 70 to fit between the first and second base walls 204 and 206. The base portion 202 of the second spring clip 22 i thus constructed to fit over the bolt 14 as shown in FIGS. 1 and 2.

Figure 6A:
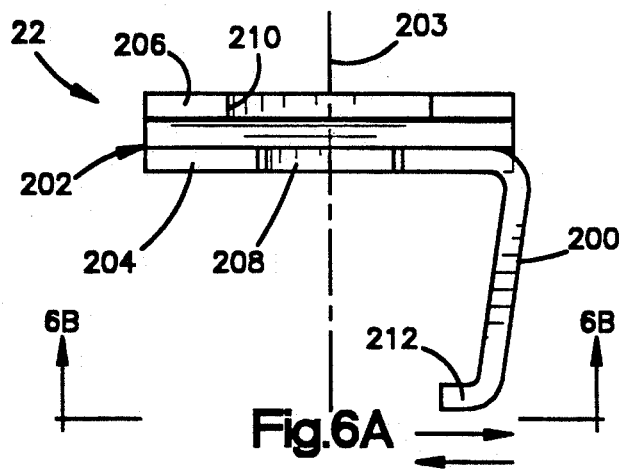
FIG. 6A is a view of another part of the apparatus of FIGS. 1 and 2.
Figure 6B:
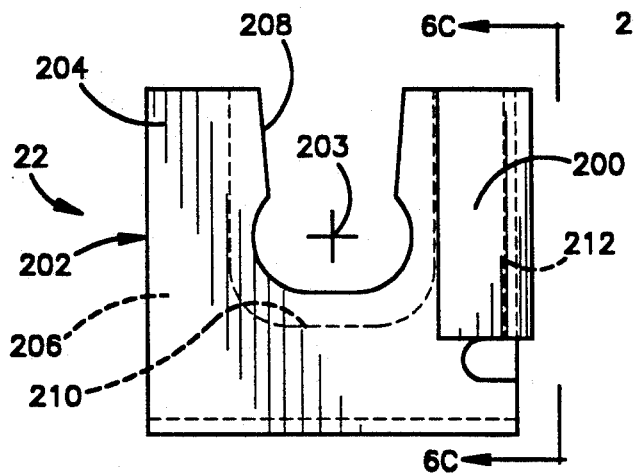
FIG. 6B is a view taken on line 6B—6B of FIG. 6A.
Figure 6C:
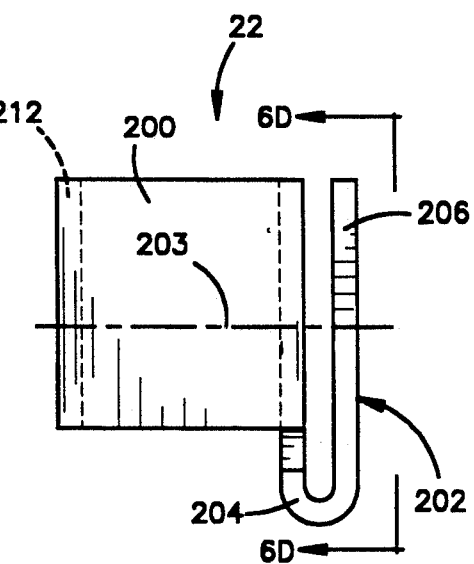
FIG. 6C is a view taken on line 6C—6C of FIG. 6B.
Figure 6D:
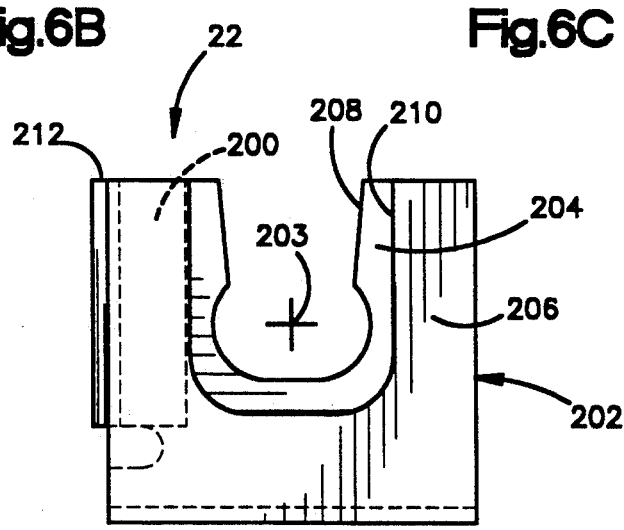
FIG. 6D is a view taken on line 6D—6D of FIG. 6C.

The spring arm 200 of the second spring clip 22 extends from one side of the base portion 202 at a slight inclination to the axis 203, as shown in FIG. 6A, and has an end portion 212 which extends in a direction substantially perpendicular to the axis 203. The spring arm 200 is movable relative to the base portion 202 against the bias of the second spring clip 22 in a direction away from the axis 203, as indicated by the arrow pointing to the right in FIG. 6A, and is movable relative to the base portion 202 back in the opposite direction toward the axis under the influence of the bias, as indicated by the arrow pointing to the left in FIG. 6A.

Referring again to FIG. 1, the second spring clip 22 has an initial position engaged with the yoke 12 and the bolt 14. When the second spring clip 22 is in its initial position, the base portion 202 of the second spring clip 22 is received over the bolt 14 as described above. The spring arm 200 extends from the base portion 202 in a direction generally parallel to the third axis 54 of the yoke 12, and the end portion 212 of the spring arm 200 rests on the upper surface 60 of the adjacent clamping portion 50 of the yoke 12.

The first and second spring clips 20 and 22 are both preferably formed of SAE grade 1050 spring steel per ASTM A684-81.

As described above, the second spring clip 22 blocks rotation of the bolt 14 The second spring clip 22 thus holds the cylindrical recessed portion 82 of the bolt 14 from turning out of the position shown in FIG. 1. When the recessed portion 82 of the bolt 14 is in that position, it provides clearance for the shaft 11 to be inserted into the longitudinal passage 45 in the yoke 12. The yoke 12, the bolt 14 and the second spring clip 22 ca therefore be shipped in a condition in which a customer can insert the shaft 11 into the yoke 12 without first turning the bolt 14 to find the correct position for the recessed portion 82.

The bolt 14 is movable from its initial position to its installed position when the notch 32 on the shaft 11 is located in the transverse passage 55 in the yoke 12, as shown in FIG. 2. The notch 32 on the shaft 11 then provides clearance for axial movement of the bolt 14 in the transverse passage 55. Axial movement of the bolt 14 toward its installed position is caused by rotation of the nut 16, which is held at its axial location by the first clip 20 as described above. When the bolt 14 reaches its installed position, the shank 72 extends through the notch 32 on the shaft 11 and thus blocks axial movement of the shaft 11 in the longitudinal passage 45.

As the nut 16 is tightened against the adjacent belleville washer 18 and the yoke 12, the nut 16 moves axially toward the yoke 12 in the amount that the adjacent belleville washer 18 is compressed. The nut 16 moves the first spring clip 20 the same amount from its first locking position, as shown in FIG. 1, to a second locking position, as shown in FIG. 2. The end portion 112 of the spring arm 100 is then spaced slightly from the adjacent inner surface 58 of the yoke 12, but remains in the space between the two inner surfaces 58 unless it is moved upward out of that space against the bias of the first spring clip 20.

When the bolt 14 is moved axially in the transverse passage 55 by rotation of the nut 16 on the bolt 14, the second spring clip 22 is moved by the bolt 14 from its initial position to its locking position. As the bolt 14 moves the second spring clip 22 to the right as viewed in FIG. 1, the end portion 212 of the second spring clip 22 slides upward along the upper surface 60 of the yoke 12, and thus moves relative to the base portion 202 against the bias of the second spring clip 22. The end portion 212 is moved along the upper surface 60 against the bias of the second spring clip 22 until it reaches an intermediate position which is shown in broken lines in FIG. 1. The end portion 212 is then moved past the edge of the upper surface 60 and into the space between the opposed inner surfaces 58 of the yoke 12 as the bolt 14 is moved fully into its installed position. The end portion 212 moves downward into the space between the opposed inner surfaces 58 under the influence of the bias of the second spring clip 22. The second spring clip 22 is thus moved resiliently into its locking position upon movement of the bolt 14 from its initial position to its installed position by rotation of the nut 16 on the bolt 14. Like the first spring clip 20, the second spring clip 22 will remain in its locking position unless the end portion 212 of the spring arm 200 is moved out of the space between the opposed inner surfaces 58 of the yoke 12 against the bias of the second spring clip 22.

When the apparatus 10 is locked as shown in FIG. 2, the shaft 11 is held from moving axially in the yoke 12 by the clamping force exerted against the shaft 11 by the yoke 12. The clamping force is the primary means for holding the shaft 11 in the yoke 12, and is a result of the load applied by the tightened bolt 14 and nut 16. The notch 32 on the shaft 11 and the portion of the bolt 14 extending through the notch 32 provide a secondary means for holding the shaft 11 in the yoke 12 if the primary means fails. The first spring clip 20 holds the nut 16 against the yoke 12 even if the nut 16 becomes loosened. The second spring clip 22 holds the bolt 14 in its installed position because the second spring clip 22 blocks axial movement of the bolt 14 along the axis 54. Additionally, the first and second spring clips 20 and 22 hold the bolt 14 in the yoke 12 even if the bolt 14 becomes severed, because the spring clips 20 and 22 are interlocked with the yoke 12, the bolt 14 and the nut 16 to prevent severed pieces of the bolt 14 from moving out of the transverse passage 55 in the yoke 12.

The apparatus 10 further includes an optional locking pin 250 which is received in an interference fit in the passage 65 in the yoke 12. The locking pin 250 extends across the flat recessed portion 80 of the bolt 14 and prevents rotation of the bolt 14 as the nut 16 is being rotated to move the bolt 14 axially into its installed position. In the preferred embodiment of the invention, the locking pin 250 is a needle roller, Torrington part number C-954Q.

A second embodiment of the invention is shown in FIGS. 7-9B. The second embodiment of the invention is an apparatus 300 including a single spring clip 302. Like the apparatus 10 described above, the apparatus 300 includes a yoke 304 in which a splined shaft 306 is clamped by a bolt 308 and a nut 310. The apparatus 300 also includes a pair of belleville washers 312 and a locking pin 314. The preferences for materials for the parts in the second embodiment of the invention are the same as in the first embodiment.

The bolt 308 has a head 316 and a shank 318. The head 316 has a slot 320 with a bottom surface 322. The shank 318 has a recessed portion 324 with a flat surface 326.

The yoke 304 has a cylindrical inner surface 328 which defines a small passage 330 like the passage 65 described above with reference to the yoke 12. The locking pin 314 is received in the passage 330, and extends transversely across the flat surface 326 in the recessed portion 324 of the bolt 308.

As shown in FIGS. 9A and 9B, the spring clip 302 is an elongate piece of spring steel (SAE grade 1050 per ASTM A684-81) having a first end portion 332 and a second end portion 334. The first end portion 332 has an opening 336. The opening 336 has a size and shape for the bolt 308 and the nut 310 to be received in the opening 336 as shown in FIGS. 7 and 8. The nut 310 is rotatable on the bolt 308 relative to the spring clip 302 when the bolt 308 and the nut 310 are thus received in the opening 336.

The second end portion 334 of the spring clip 302 is movable relative to the first end portion 332 against a bias of the spring clip 302 in a direction indicated generally by the arrow shown in FIG. 9, and is movable relative to the first end portion 332 back in the opposite direction under the influence of the bias of the spring clip 302. Additionally, the second end portion 334 of the spring clip 302 fits within the slot 320 extending across the head 316 of the bolt 308.

As shown in FIG. 7, the spring clip 302 has an initial position in which the first end portion 332 is engaged with the nut 310 and the second end portion 334 is engaged with the bolt 308. When the nut 310 is rotated on the bolt 308, the locking pin 314 prevents the bolt 308 from rotating. The locking pin 314 thus causes the bolt 308 to be moved axially into its installed position, as shown in FIG. 8, by rotation of the nut 310 on the bolt 308. As the bolt 308 moves toward its installed position, the second end portion 334 of the spring clip 302 slides against the bottom surface 322 of the slot 320, and thus moves from the position shown in FIG. 7 to the position shown in FIG. 8 under the influence of the bias of the spring clip 302. Movement of the bolt 308, the nut 310 and/or severed pieces of the bolt 308 out of the yoke 304 will be resisted by the bias of the spring clip 302.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
   a bolt receiving member having a passage with an axis;
   a bolt movable in said passage, said bolt having a partially installed position in said passage and an installed position in said passage, said bolt being movable along said axis in an axially inward direction from said partially installed position to said installed position; and
   a spring clip means for moving with said bolt when said bolt is moved from said partially installed position to said installed position and for locking said bolt in said installed position, said spring clip means having first and second portions;
   said first and second portions of said spring clip means having initial positions in which said first portion engages said bolt and said second portion engages said bolt receiving member;
   said first and second portions of said spring clip means further having locking positions in which said first portion engages said bolt and said second portion interlocks with said bolt receiving member to block movement of said bolt out of said passage; and
   said second portion of said spring clip means being movable in a first direction against a bias of said spring clip means from said initial position to an intermediate position upon a first amount of movement of said bolt in said axially inward direction from said partially installed position toward said installed position, and being movable in a second direction opposite the first direction and under the influence of said bias from said intermediate position to said locking position upon further movement of said bolt in said axially inward direction toward said installed position, whereby said second portion of said spring clip means moves resiliently into said locking position to interlock with said bolt receiving member upon movement of said bolt in said axially inward direction from said partially installed position to said installed position.

2. An apparatus as defined in claim 1 wherein said spring clip means consists of a single piece of spring steel.

3. An apparatus as defined in claim 1 further comprising a nut receivable on said bolt, said bolt receiving member being a yoke with a passage for receiving a steering shaft in a vehicle steering system, said yoke having means for clamping the steering shaft in said passage under the influence of a clamping force applied to said yoke by said bolt and said nut when said nut is received on said bolt.

4. An apparatus as defined in claim 3 further comprising a second spring clip means for holding said nut from moving axially relative to said bolt and said yoke upon rotation of said nut on said bolt, whereby said second spring clip means causes such rotation of said nut to move said bolt toward said installed position.

5. An apparatus comprising:
   a bolt receiving member having a passage;
   a bolt movable into an installed position in said passage; and
   a spring clip means for moving with said bolt when said bolt is moved into said installed position and for locking said bolt in said installed position, said spring clip means having first and second portions;
   said first and second portions of said spring clip means having initial positions in which said first portion engages said bolt and said second portion engages said bolt receiving member;
   said first and second portions of said spring clip means further having locking positions in which said first portion engages said bolt and said second portion interlocks with said bolt receiving member to block movement of said bolt out of said passage;
   said second portion of said spring clip means being movable against a bias of said spring clip means from said initial position to an intermediate position upon movement of said bolt in said passage, and being movable under the influence of said bias from said intermediate position to said locking position upon movement of said bolt into said installed position, whereby said second portion of said spring clip means moves resiliently into said locking position to interlock with said bolt receiving member upon movement of said bolt into said installed position; and
   said passage having an axis, said bolt having a shaft rotatable about said axis, said bolt having an initial position in said passage spaced axially from said installed position, said shaft having a predetermined rotational position in said passage when said bolt is in said initial position, said spring clip means and said bolt having means for blocking rotation of said bolt out of said initial position.

6. An apparatus as defined in claim 5 wherein said blocking means blocks rotation of said bolt in said passage when said bolt is being moved axially from said initial position toward said installed position.

7. An apparatus as defined in claim 5 wherein said spring clip means consists of a single piece of spring steel.

8. An apparatus comprising:
   a bolt receiving member having a passage;
   a bolt movable into an installed position in said passage; and
   a spring clip means for moving with said bolt when said bolt is moved into said installed position and for locking said bolt in said installed position, said spring clip means having first and second portions;
   said first and second portions of said spring clip means having initial positions in which said first portion engages said bolt and said second portion engages said bolt receiving member;
   said first and second portions of said spring clip means further having locking positions in which said first portion engages said bolt and said second portion interlocks with said bolt receiving member to block movement of said bolt out of said passage;

said second portion of said spring clip means being movable against a bias of said spring clip means from said initial position to an intermediate position upon movement of said bolt in said passage, and being movable under the influence of said bias from said intermediate position to said locking position upon movement of said bolt into said installed position, whereby said second portion of said spring clip means moves resiliently into said locking position to interlock with said bolt receiving member upon movement of said bolt into said installed position; and said bolt receiving member having a cam surface means and a locking surface means, said cam surface means guiding said second portion of said spring clip means to move from said initial position to said intermediate position in sliding contact with said cam surface means, said locking surface means interlocking with said second portion of said spring clip means when said second portion of said spring clip means is in said locking position.

9. An apparatus as defined in claim 8 wherein said spring clip means consists of a single piece of spring steel.

10. An apparatus comprising:
a bolt receiving member having a passage;
a bolt movable into an installed position in said passage;
a nut receivable on said bolt; and
a spring clip means for moving with said bolt when said bolt is moved into said installed position and for locking said bolt in said installed position, said spring clip means having first and second portions;
said first and second portions of said spring clip means having initial positions in which said first portion engages said bolt and said second portion engages said bolt receiving member;
said first and second portions of said spring clip means further having locking positions in which said first portion engages said bolt and said second portion interlocks with said bolt receiving member to block movement of said bolt out of said passage;
said second portion of said spring clip means being movable against a bias of said spring clip means from said initial position to an intermediate position upon movement of said bolt in said passage, and being movable under the influence of said bias from said intermediate position to said locking position upon movement of said bolt into said installed position, whereby said second portion of said spring clip means moves resiliently into said locking position to interlock with said bolt receiving member upon movement of said bolt into said installed position; and
said bolt receiving member being a yoke with a passage for receiving a steering shaft in a vehicle steering system, said yoke having means for clamping the steering shaft in said passage under the influence of a clamping force applied to said yoke by said bolt and said nut when said nut is received on said bolt.

11. An apparatus as defined in claim 10 further comprising a second spring clip means for holding said nut from moving axially relative to said bolt and said yoke upon rotation of said nut on said bolt, whereby said second spring clip means causes such rotation of said nut to move said bolt toward said installed position.

12. An apparatus as defined in claim 10 wherein said spring clip means consists of a single piece of spring steel.

13. An apparatus comprising:
a bolt receiving member having a passage with an axis;
a bolt movable into said passage in an axially inward direction, said bolt having an installed position in said passage; and
a spring clip means for moving with said bolt when said bolt is moved into said installed position and for blocking movement of said bolt out of said installed position, said spring clip means having first and second portions;
said first and second portions of said spring clip means having locking positions in which said first portion engages said bolt receiving member and said second portion engages said bolt to block movement of said bolt out of said passage, said second portion of said spring clip means being movable out of said locking position and away from said first portion in an axially outward direction opposite the axially inward direction against a bias of said spring clip means when said bolt is in said installed position; and
said second portion of said spring clip means being movable with said bolt into said locking position toward said first portion in the axially inward direction and under the influence of said bias of said spring clip means upon movement of said bolt to said installed position in said axially inward direction.

14. An apparatus as defined in claim 13 wherein said spring clip means consists of a single piece of spring steel.

15. An apparatus as defined in claim 13 wherein said spring clip means and said bolt have means for blocking rotation of said bolt in said passage.

16. An apparatus as defined in claim 13 wherein said bolt receiving member is a nut rotatable on said bolt.

17. An apparatus comprising:
a bolt receiving member having a passage;
a bolt movable into an installed position in said passage;
a spring clip means for moving with said bolt when said bolt is moved into said installed position and for blocking movement of said bolt out of said installed position, said spring clip means having first and second portions;
said first and second portions of said spring clip means having locking positions in which said first portion engages said bolt receiving member and said second portion engages said bolt to block movement of said bolt out of said passage;
said second portion of said spring clip means being movable into said locking position under the influence of a bias of said spring clip means upon movement of said bolt into said installed position; and
said spring clip means and said bolt having means for blocking rotation of said bolt in said passage.

18. An apparatus as defined in claim 17 wherein said bolt receiving member is a nut rotatable on said bolt.

19. An apparatus as defined in claim 17 wherein said spring clip means consists of a single piece of spring steel.

20. An apparatus comprising:
a bolt receiving member having a passage;

a bolt movable into an installed position in said passage;

a nut receivable on said bolt; and a spring clip means for moving with said bolt when said bolt is moved into said installed position and for blocking movement of said bolt out of said installed position, said spring clip means having first and second portions;

said first and second portions of said spring clip means having locking positions in which said first portion engages said nut and said second portion engages said bolt to block movement of said bolt out of said passage;

said second portion of said spring clip means being movable into said locking position under the influence of a bias of said spring clip means upon movement of said bolt into said installed position; and said bolt receiving member being a yoke with a passage for receiving a steering shaft in a vehicle steering system, said yoke having means for clamping the steering shaft in said passage under the influence of a clamping force applied to said yoke by said bolt and said nut when said nut is received on said bolt.

21. An apparatus as defined in claim 20 wherein said spring clip means consists of a single piece of spring steel.

* * * * *